(12) United States Patent
Schütz

(10) Patent No.: US 6,598,601 B2
(45) Date of Patent: Jul. 29, 2003

(54) SOLAR COLLECTOR

(75) Inventor: Udo Schütz, Selters (DE)

(73) Assignee: Schütz GmbH & Co. KGaA, Selters (DE)

( * ) Notice: Subject to any disclaimer, the term of this patent is extended or adjusted under 35 U.S.C. 154(b) by 0 days.

(21) Appl. No.: 10/189,350

(22) Filed: Jul. 3, 2002

(65) Prior Publication Data

US 2003/0010335 A1 Jan. 16, 2003

(30) Foreign Application Priority Data

Jul. 5, 2001 (DE) .......................... 101 32 639

(51) Int. Cl.[7] ................................ F24J 2/24; F24J 2/50
(52) U.S. Cl. ...................... 126/655; 126/651; 126/652
(58) Field of Search ..................... 126/655, 651, 126/652

(56) References Cited

U.S. PATENT DOCUMENTS 4,136,673 A * 1/1979 Escher ...................... 126/606
4,222,372 A * 9/1980 Bogatzki ................... 126/655
4,279,242 A * 7/1981 Bogatzki ................... 126/655
4,505,258 A * 3/1985 Yoon ......................... 126/600

FOREIGN PATENT DOCUMENTS

DE        198 21 137 A1    11/1999

* cited by examiner

*Primary Examiner*—Alfred Basichas
(74) *Attorney, Agent, or Firm*—Friedrich Kueffner

(57) ABSTRACT

A solar collector has a distribution and collecting unit having a housing and a distribution channel and a connecting channel arranged in the housing. Collector tubes for heating a fluid medium are connected to the housing. The collector tubes have an adaptor, respectively, with a rotary closure for connecting the collector tubes to the distribution channel and the collecting channel of the housing. The adaptor is rotatably adjustable for aligning the collector tubes relative to the solar radiation in order to improve thermal output of the solar collector.

11 Claims, 6 Drawing Sheets

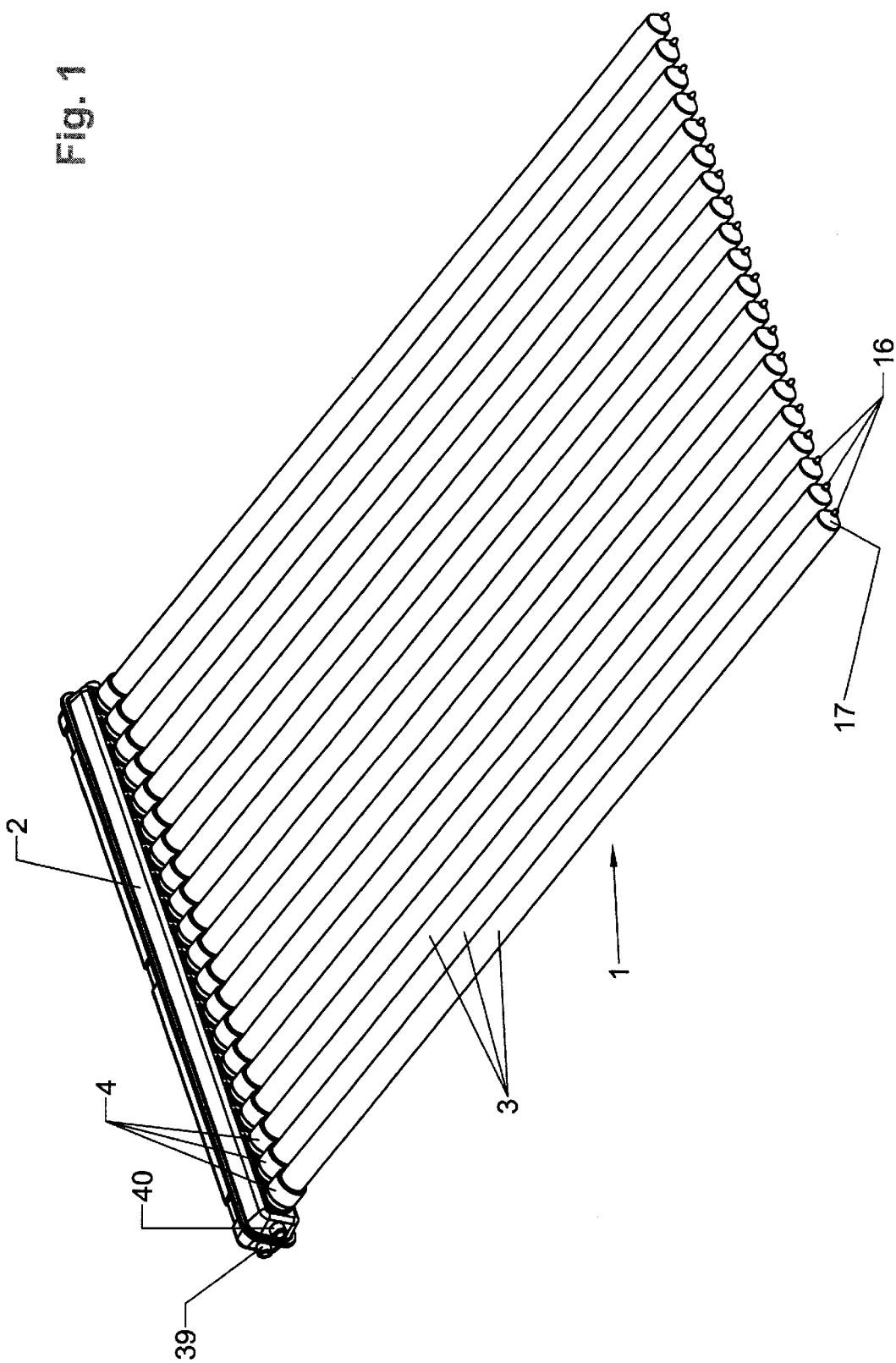

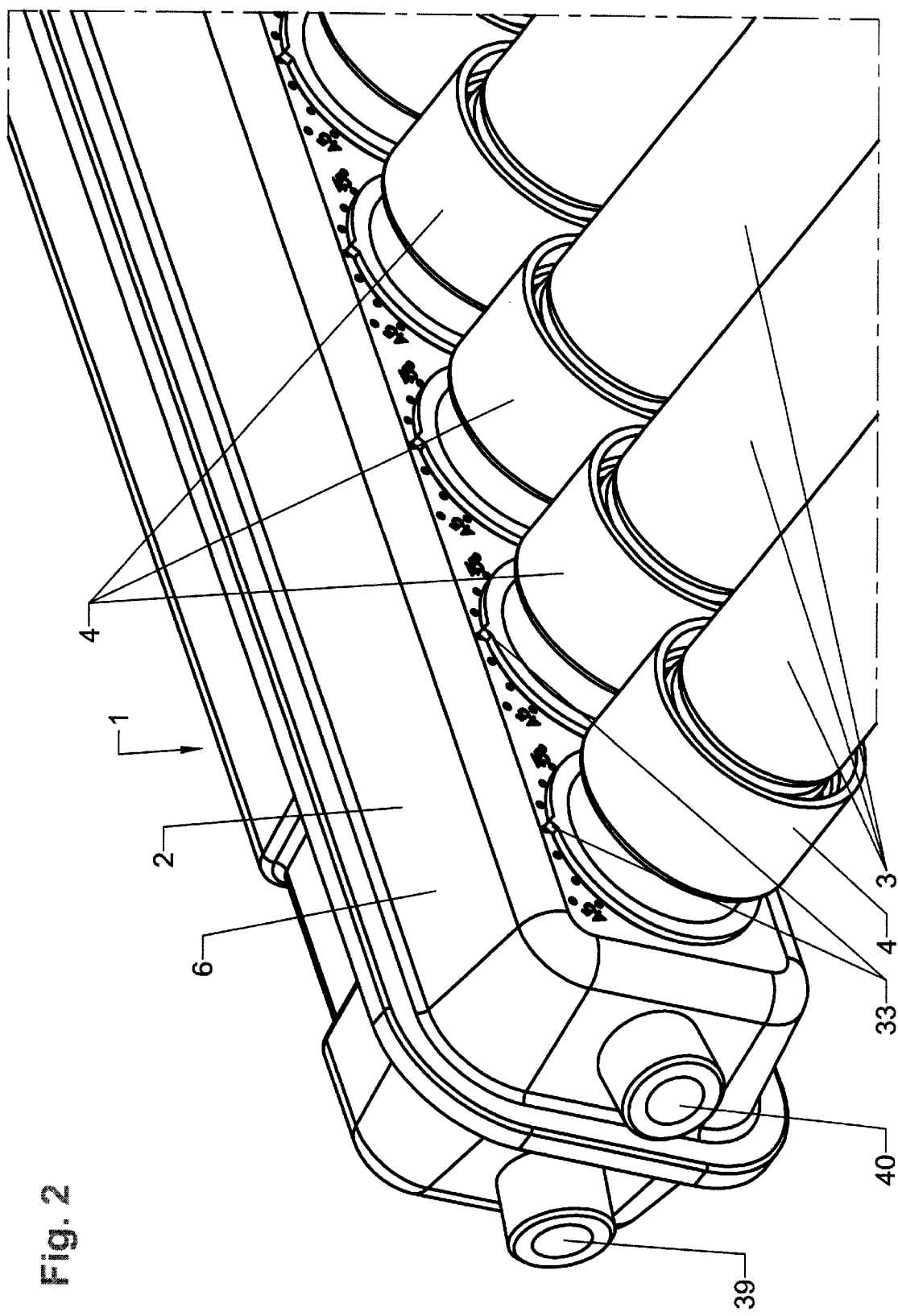

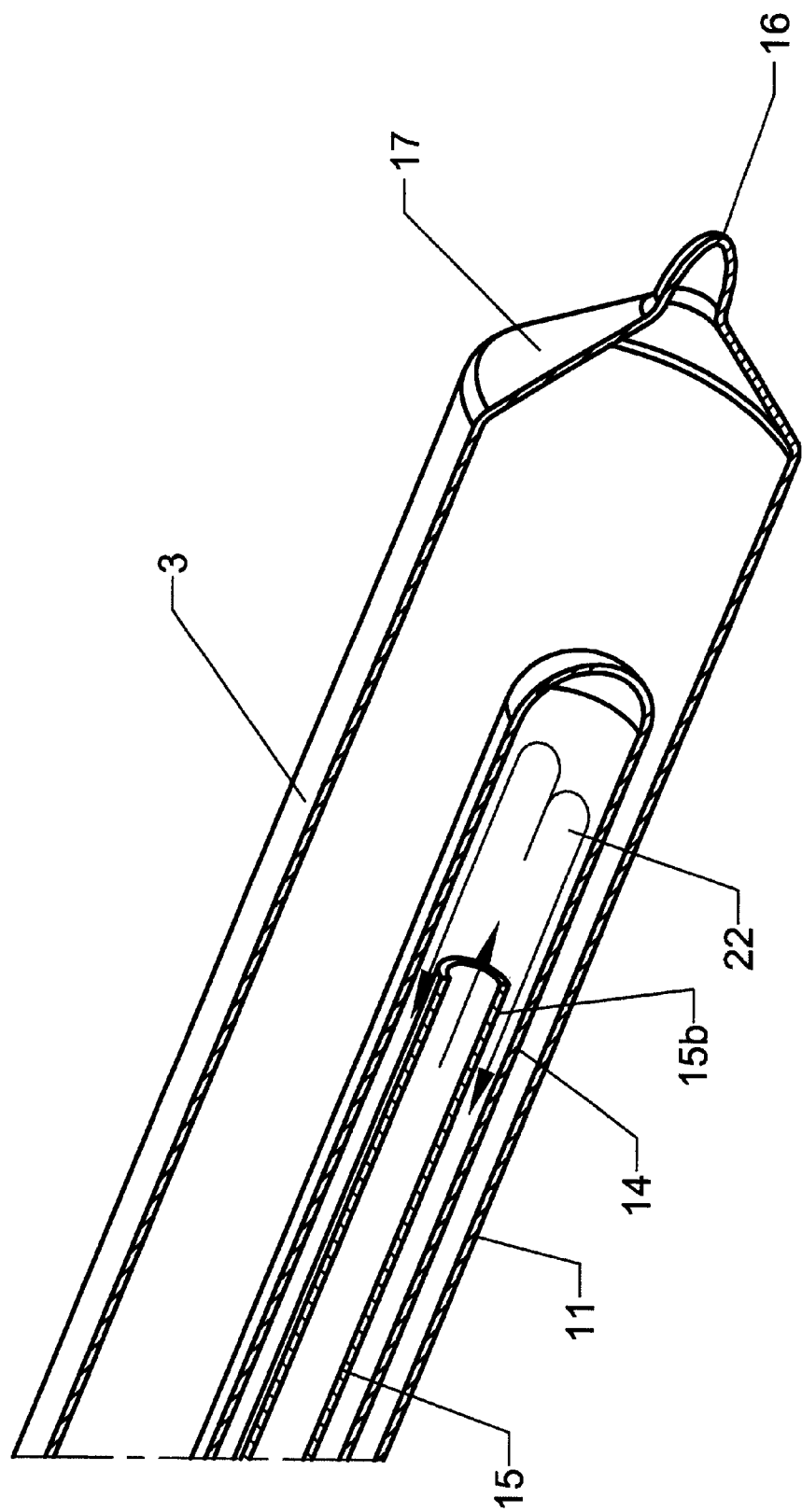

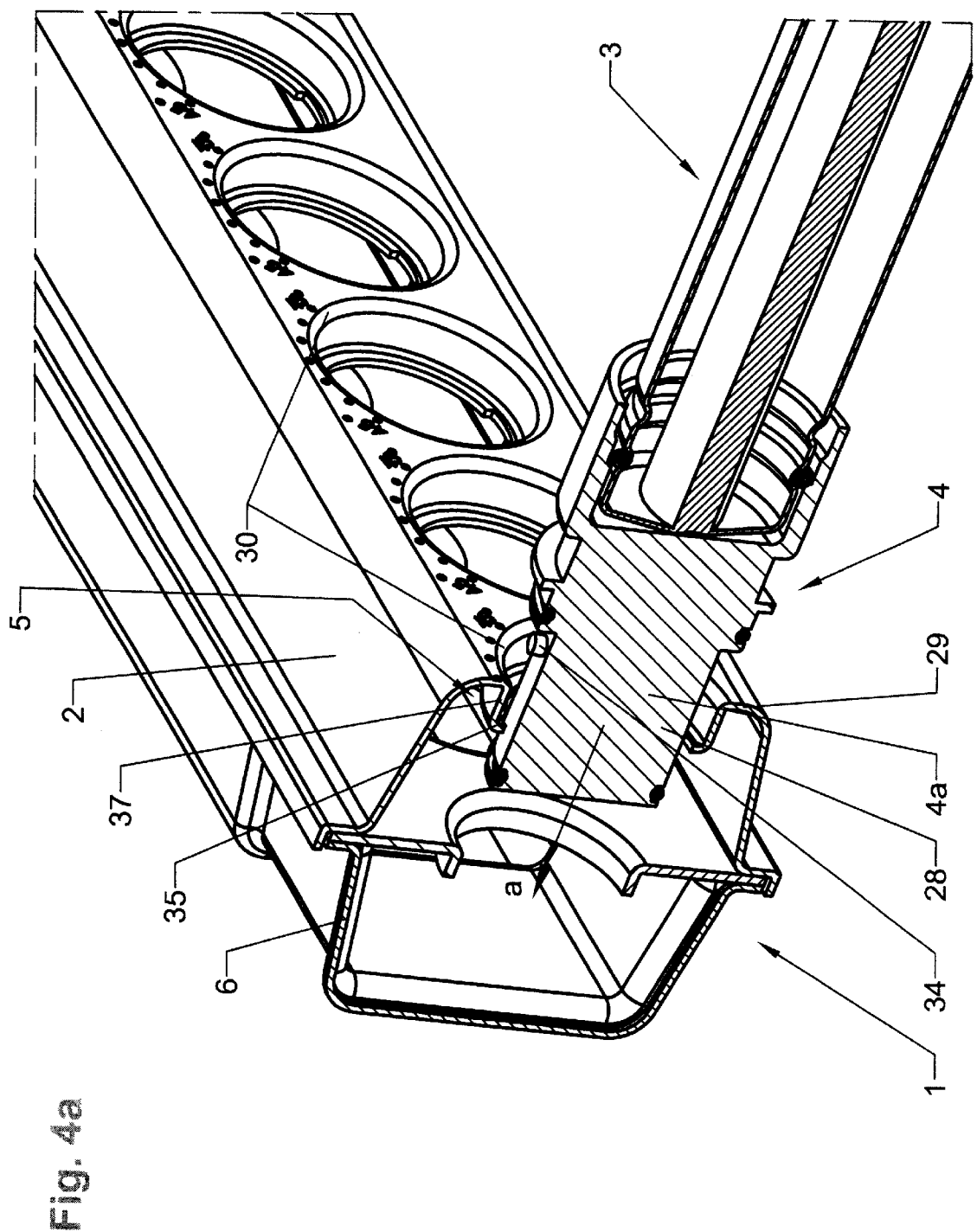

US 6,598,601 B2

SOLAR COLLECTOR

BACKGROUND OF THE INVENTION

1. Field of the Invention

The invention relates to a solar collector comprising collector tubes for heating a fluid medium, in particular, water, connected to the housing of a distribution and collecting unit.

2. Description of the Related Art

The collector tubes, which are in the form of vacuum tubes, of a solar collector of the aforementioned kind described in German patent document 198 21 137 A1 are comprised of: an outer envelope tube of borosilicate glass whose lower mantle half is provided at the inner side of the tube with a reflector coating made of silver; an absorber tube of borosilicate glass arranged within the lower mantle half of the envelope tube and having an absorption layer; and a supply pipe inserted into the absorber tube for supplying the fluid to be heated, in particular, water. The envelope tube is inserted with one end closed off by a lid into a corresponding opening of a distribution and collecting unit made of plastic material and connected thereto by gluing. The other closed end of the envelope tube is seated in a corresponding opening of a base attachment and is connected thereto by gluing. The housing of the distribution and collecting unit is divided by a partition into a distribution channel for the cold liquid and into a collecting channel for the heated liquid. The supply pipe for the cold liquid is inserted into a through bore, arranged in the partition between the distribution channel and the connecting channel and extending into the distribution channel, and is glued to the partition; it passes through the collecting channel of the distribution and collecting unit and extends through the absorber tube into the area of the closed end of the absorber tube. The absorber tube is inserted with its open end into a bore, arranged in the housing wall of the distribution and collecting unit and opening into the collecting channel, and is glued thereto; it projects through an opening of the closure lid of the envelope tube into the envelope tube and extends with its closed end into the area of the closed end of the envelope tube evacuated by means of a socket provided in its closure lid. The liquid to be heated, i.e., the heat energy carrier medium, flows from the distribution channel of the distribution and collecting unit through the supply pipe into the absorber tube, is heated in the absorber tube, and flows into the collecting channel of the distribution and collecting unit.

The known tube collector can be mounted as a modular system on roofs and walls of buildings. As a function of the mounting conditions and the proposed thermal output, modules with identical and different numbers of tubes can be used and the individual modules of a solar collector device can be sequentially connected in series.

The significant disadvantage of solar collectors according to German patent document 198 21 137 A1 is to be seen in that the collector modules, as a function of the mounting conditions, can be aligned only to a limited extent relative to the solar radiation for the purpose of obtaining a thermal output as high as possible. Moreover, mounting of the modules is complex because the modules, depending on their size, are correspondingly bulky so that their transport to the location of mounting is cumbersome.

SUMMARY OF THE INVENTION

The invention has the object to develop a solar collector which is characterized by a simple mounting action and whose collector tubes, with respect to the greatest possible heat energy yield, can be adjusted optimally to the solar radiation independent of the respective mounting conditions.

In accordance with the invention, this object is solved by a solar collector wherein the collector tubes have an adaptor having a rotary closure like a bayonet closure for connecting the tubes to a distribution channel and a collecting channel of the housing of the distribution and collecting unit and further having a rotary adjustability for alignment of the collector tubes relative to the solar radiation.

The solar collector according to the invention has the following advantages.

The collector tubes can be connected at the mounting location individually by means of a bayonet closure in a simple way to the housing of the distribution and collecting unit of the solar collector and, with respect to an optimal efficiency of the collector, can be aligned by a rotary adjustment about a certain angular range relative to the solar radiation. Because of the possibility of individual mounting of the collector tubes, the mounting of the solar collector on finished roofs is simple because the individual parts of the solar collectors can be transported by a technician onto the roof and can be assembled there. Moreover, the solar collectors can be provided as a modular system wherein the pre-mounted collector modules for mounting on large-size roof areas, for example, in the case of industrial buildings, can be transported to the mounting location on the roof by means of a lifting device, in particular, by means of a crane.

BRIEF DESCRIPTION OF THE DRAWING

In the drawing:

FIG. 1 shows a perspective view of a solar collector;

FIG. 2 shows a perspective illustration of a detail of a solar collector according to FIG. 1;

FIG. 3b shows the right end of the collector tube as an extension of the cross-sectional view of FIG. 3a;

FIG. 4a shows a first stage of mounting the collector tube at the beginning of insertion.

DESCRIPTION OF THE PREFERRED EMBODIMENTS

Figure 3A:
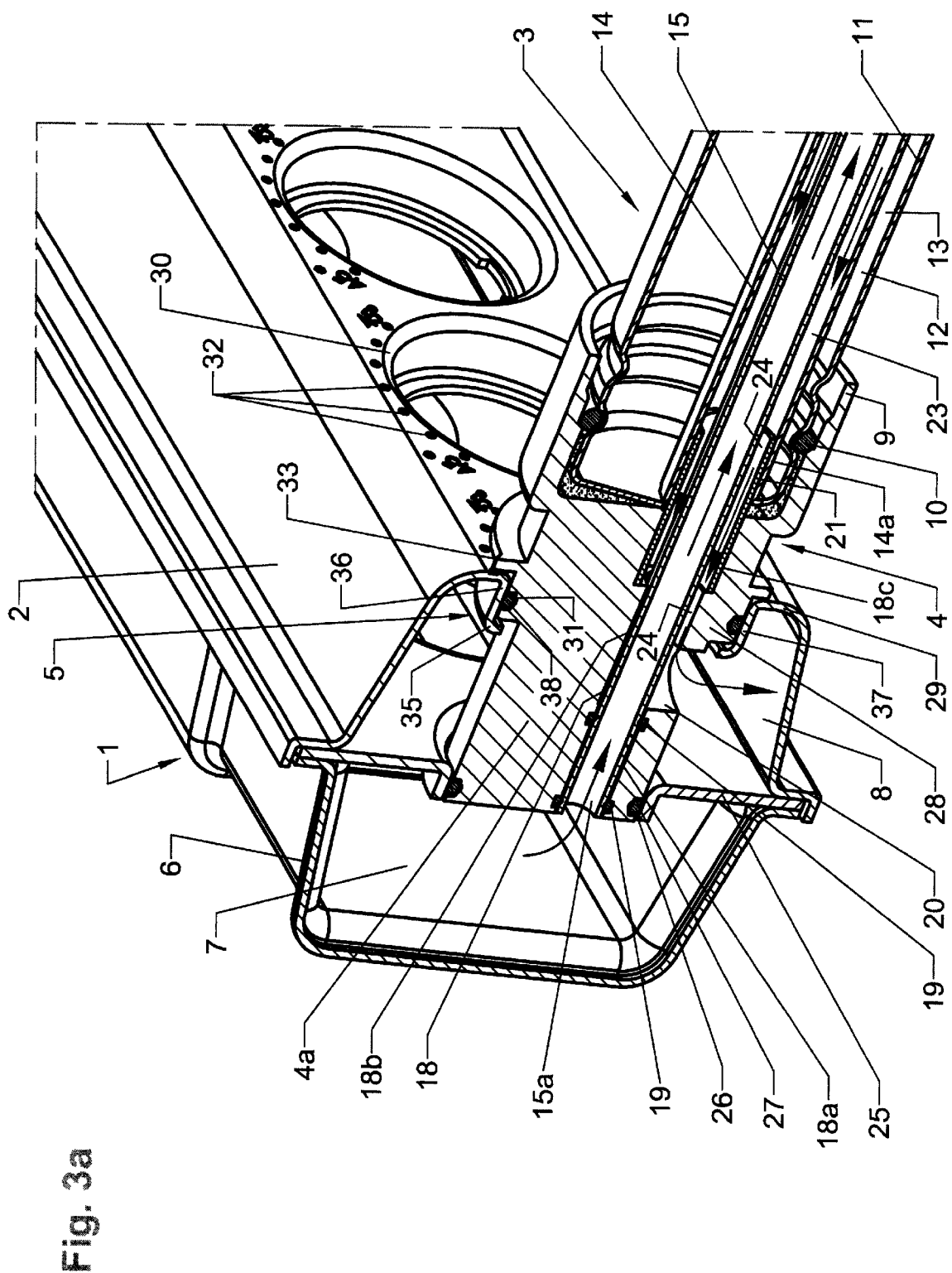
FIG. 3a shows a cross-section of the distribution and collecting unit of the solar collector with a longitudinal section illustration of a connected collector tube.

The solar collector 1 according to FIGS. 1 through 3 is comprised of a distributing and collecting unit 2 as well as a number of collector tubes 3 connected to the distribution and collecting unit 2 for heating a fluid medium such as water.

The collector tubes 3 have an adaptor 4 made of brass with a rotary closure embodied as a bayonet closure 5 for connecting the tubes to a distribution channel 7 and a collecting channel 8 of the housing 6 made of metal of the distribution and collecting unit 2. The tubes 3 are supported rotatably in the housing 6 of the distribution and collecting unit 2 for alignment relative to the solar radiation.

A collector tube 3 is inserted into the outer connector socket 9 of the cylindrical adaptor 4, is glued to the socket 9 and the solid adaptor body 4a, and is sealed by means of a sealing ring 10 relative to the socket 9.

The collector tube 3 formed as a vacuum tube is comprised of an outer closed envelope tube 11 which is transparent to sunlight and made of borosilicate glass. The tube 11 has a lower tube area 12 provided with a reflector coating 13 applied to the inner side of the tube and comprised of silver. The collector tube 3 further comprises an absorber tube 14 arranged within and parallel to the envelope tube 11 wherein the absorber tube 14 is formed as a unitary part of the envelope tube 11 and is also comprised of borosilicate glass. The exterior of the absorber tube 14 is provided with a selective absorption coating. The collector tube 3 comprises also a supply pipe 15 for the liquid to be heated arranged within and parallel, preferably coaxially, to the absorber tube 14.

The envelope tube 11 of the collector tube 3 is evacuated by means of a socket 16, formed on the tube end 17 facing away from the adaptor 4, and filled with a noble gas, for example, xenon. By providing a vacuum filled subsequently with a noble gas the reflector coating 13 on the inner side of the envelope tube 11 is protected. The socket 16 of the envelope tube 11 is pinched off or sealed by melting after evacuation and filling of the tube with a noble gas.

The supply pipe 15 of the collector tube 3 is inserted into a through channel 18 of the adaptor 4 and connected to the distribution channel 7 of the distribution and collecting unit 2. The through channel 18 of the adaptor 4 has an inner channel section 18a into which the inner end 15a of the supply pipe 15 is glued and sealed by means of sealing rings 19. Moreover, it has a central channel section 18b which is wider than the inner channel section 18a and is connected by means of a branch bore 20 with the collecting channel 8 of the distribution and collecting unit 2. The through channel 18 also has an outer channel section 18c which is wider than the central channel section 18b.

A pipe sleeve 21 is inserted into the inner end 14a of the absorber tube 14 of the adaptor 4 which extends into the outer channel section 18c of the through channel 18 of the adaptor 4.

The outer end 15b of the supply pipe 15 opens into the outer closed section 22 of the absorber tube 14.

The annular channel 23, which is formed by the absorber tube 14 and the supply pipe 15, is connected via the annular channel 24, which is formed by the pipe sleeve 21 and the central section 18b of the through channel 18, on the one hand, and the supply pipe 15, on the other hand, as well as the branch bore 20 with the collecting channel 8 of the distribution and collecting unit 2 of the solar collector 1.

The adaptor 4 penetrates the collecting channel 8 in the housing 6 of the distribution and collecting unit 2 and is rotatably inserted into an opening 26 in the partition 25 between the distribution channel 7 and the collecting channel 8 of the distribution and collecting unit 2 and is sealed by means of a sealing ring 27 relative to the partition 25.

The adaptor 4 is inserted with its central section 28 into a corresponding opening 30 in the outer wall 29 of the housing 6 of the distribution and collecting unit 2. It is sealed relative to the outer wall 29 by means of a sealing ring 31 and is detachably mounted by means of a bayonet closure 5 in the outer wall 29 of the distribution and collecting unit 2 and is rotatable about an angular range of ±45° for alignment of the collector tube 3 relative to the solar radiation.

At the periphery of the insertion openings 30 for the adaptors 4 with the collector tubes 3, angle graduations 32 are provided on the outer wall 29 of the housing 6 of the distribution and collecting unit 2 and the adaptors 4 are provided with an indicator in the form of a nose 33 which can be adjusted relative to the angle graduation 32.

For the rotary adjustment of the collector pipes 3, the cylindrical adaptor 4 can have engagement means over a partial area of the outer periphery for engagement by a tool.

In deviation from the described embodiment of the solar collector 1, the housing 6 of the distribution and collecting unit 2 and the adaptors 4 can be made of plastic material.

Figure 4B:
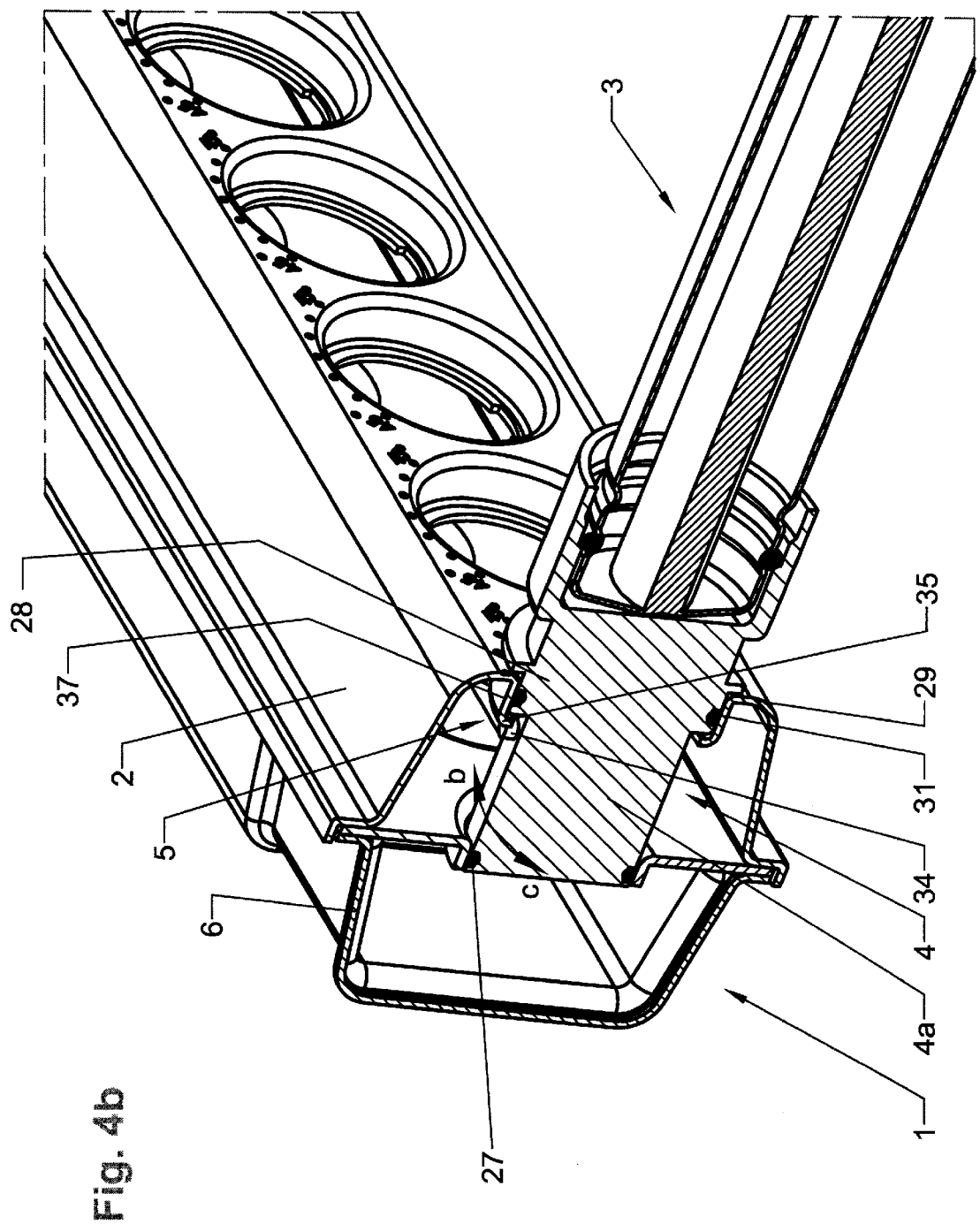
FIG. 4b shows the second stage of mounting of the collector tube in the end position of insertion.

The rotary closure (bayonet closure) 5 of the adaptor 4 of the collector tubes 3 is formed by a cam 34 formed on the central section 28 of the adaptor 4. According to FIG. 4, the cam 34 is pushed, upon insertion of the adaptor 4 of a collector tube 3, in the direction of arrow a into an opening 30 in the outer wall 29 of the housing 6 of the distribution and collecting unit 2 through an opening, not illustrated, of an inwardly projecting annular rim 35 of an annular projection 37 formed on an inner rim 36 of the insertion opening 30 through the annular rim 35 and, upon subsequent rotation of the adaptor 4, glides together with the collector pipe 3 in the direction of arrow b according to FIG. 4b behind the annular rim 35, wherein, by the clamping action exerted by the sealing rings 27 and 31, the adaptor 4 with the collector pipe 3 is secured in the housing 6 of the distribution and collecting unit 2 against accidental rotation.

By rotation of the adaptor 4 in the direction of arrow b, c, the collector tube 3 can be adjusted relative to the solar radiation wherein the adjustment of the collector tube 3 ensures always a tight sealing of the adaptor 4 in the housing wall 29 of the distribution and collecting unit 2 by means of the sealing ring 31 resting against the annular projection 37 of the housing wall 29 which sealing ring 31 is inserted into an annular groove 38 of the adaptor 4.

The water to be heated enters the distribution channel 7 of the distribution and collecting unit 2 through an inlet socket 39, flows in the flow direction indicated in FIGS. 3a and 3b through the supply pipes 15 into the absorber tubes 14 of the adaptor 4, is heated therein, flows then into the collecting channel 8 of the distribution and collecting unit 2, and exits therefrom via the outlet socket 40.

The construction of the solar collectors 1 is self-supporting, i.e., a securing frame for the collector tubes 3 is not required.

While specific embodiments of the invention have been shown and described in detail to illustrate the inventive principles, it will be understood that the invention may be embodied otherwise without departing from such principles.

What is claimed is:

1. A solar collector comprising:
    a distribution and collecting unit having a housing and a distribution channel and a connecting channel arranged in the housing;
    collector tubes for heating a fluid medium connected to the housing;
    wherein the collector tubes have an adaptor, respectively, with a rotary closure configured to connect the collector tubes to the distribution channel and the collecting channel of the housing and configured for rotary adjustability for aligning the collector tubes relative to solar radiation.

2. The solar collector according to claim 1, wherein:
    each one of the adaptors has an outer connector socket and wherein the collector tubes are inserted in a liquid-tight way into the outer connector socket, respectively;
    wherein the collector tubes are comprised of an outer closed envelope tube transparent to sunlight and having a reflector coating in a lower tube area of the envelope tube;
    wherein the collector tubes are further comprised of an absorber tube arranged in the envelope tube parallel to the envelope tube, respectively, wherein the absorber tube and the envelope tube form a unitary part and wherein the absorber tube is connected to the collecting channel;

wherein the collector tubes are further comprised of a supply pipe for the liquid to be heated, wherein the supply tube is arranged in the absorber tube and extends parallel to the absorber tube and is connected to the distribution channel and opens into an outer closed section of the absorber tube;

wherein the housing has an outer wall and a partition separating the distribution channel and the collecting channel;

wherein the adaptor penetrates the collecting channel in the housing and is rotatably inserted into an opening of the partition and is sealed relative to the partition by a first sealing ring;

wherein the adaptor has a central section inserted into an insertion opening in the outer wall of the housing and sealed relative to the outer wall by of a second sealing ring;

wherein the adapter is detachably connected by the rotary closure in the outer wall of the housing and is rotatable about a defined angular range for alignment of the collector tubes relative to the solar radiation.

3. The solar collector according to claim 2, wherein the absorber tube is arranged coaxially within the envelope tube.

4. The solar collector according to claim 1, wherein the envelope tube of the collector tubes is connected by gluing in the outer connector socket and in a solid body of the adaptor and wherein the supply pipe of the collector tubes is connected by gluing in the solid body of the adaptor.

5. The solar collector according to claim 1, wherein on a periphery of the insertion opening of the outer wall an angle graduation is provided and wherein the adaptor has an indicator adjustable relative to the angle graduation.

6. The solar collector according to claim 1, wherein the adaptor has engagement means for engagement by a tool for rotary adjustment of the collector tubes.

7. The solar collector according to claim 1, wherein the adaptor is made of metal.

8. The solar collector according to claim 7, wherein the adaptor is made of brass.

9. The solar collector according to claim 1, wherein the adaptor is made of plastic.

10. The solar collector according to claim 1, wherein the housing is made of metal.

11. The solar collector according to claim 1, wherein the housing is made of plastic.

* * * * *